United States Patent [19]
Wood

[11] 3,747,516
[45] July 24, 1973

[54] METHOD OF BALING TOWN OR URBAN REFUSE

[75] Inventor: Eric Wood, Pontefract, England

[73] Assignee: Refuse Compaction Ltd., Bedfordshire, England

[22] Filed: Apr. 22, 1971

[21] Appl. No.: 136,604

[30] Foreign Application Priority Data
Apr. 22, 1970 Great Britain.................. 19,156/70

[52] U.S. Cl.................. 100/38, 100/42, 100/93 P, 100/218, 100/232, 100/272
[51] Int. Cl........................................... B30b 15/34
[58] Field of Search....................... 100/38, 218, 42, 100/272, 35, 232, 73, 74, 75, 93 P

[56] References Cited
UNITED STATES PATENTS
| | | |
|---|---|---|
| 670,436 | 3/1901 | Schmidseder........................ 100/73 |
| 1,538,375 | 5/1925 | Berrigan.............................. 100/73 |
| 3,691,648 | 2/1971 | Kraus................................. 100/73 X |
| 2,244,078 | 6/1941 | Perlberg............................. 100/232 |
| 413,232 | 10/1889 | Houseman et al..................... 100/37 |
| 952,221 | 3/1910 | Taylor............................... 100/93 P |

Primary Examiner—Billy J. Wilhite
Attorney—Abraham A. Saffitz

[57] ABSTRACT

In forming batches of town refuse into bales in order to prevent the formation of compressed air pockets within the bale which would tend to cause the bale to increase in dimension or perhaps disintegrate, the batch of material while in the bale chamber is treated with steam so that this steam at least partially fills the pockets an upon cooling forms partial vacuums in the pockets, whereby the inherent compressive forces of compressed air pockets are avoided.

2 Claims, 4 Drawing Figures

PATENTED JUL 24 1973
3,747,516
SHEET 1 OF 2
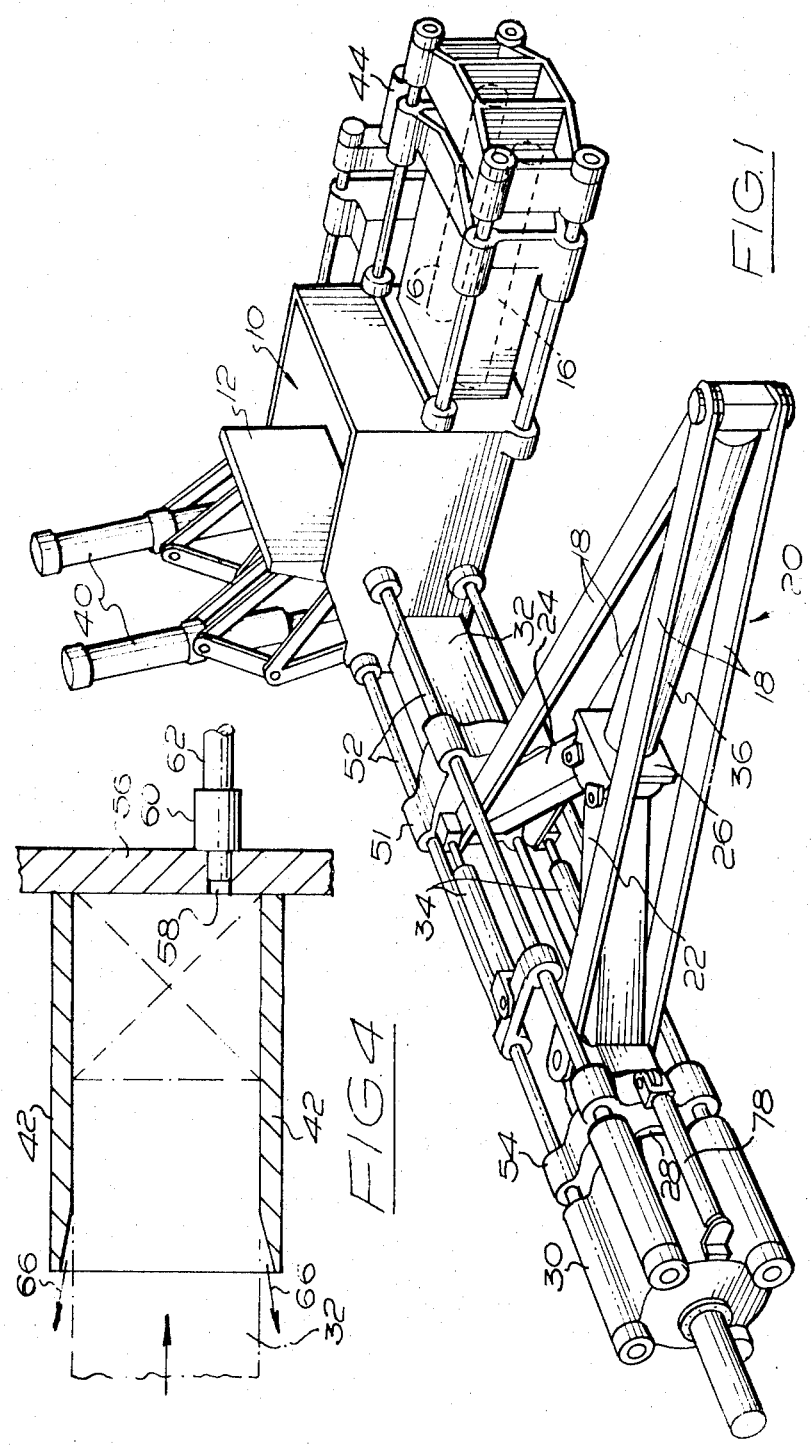
INVENTOR
ERIC WOOD
BY Abraham A. Saffitz

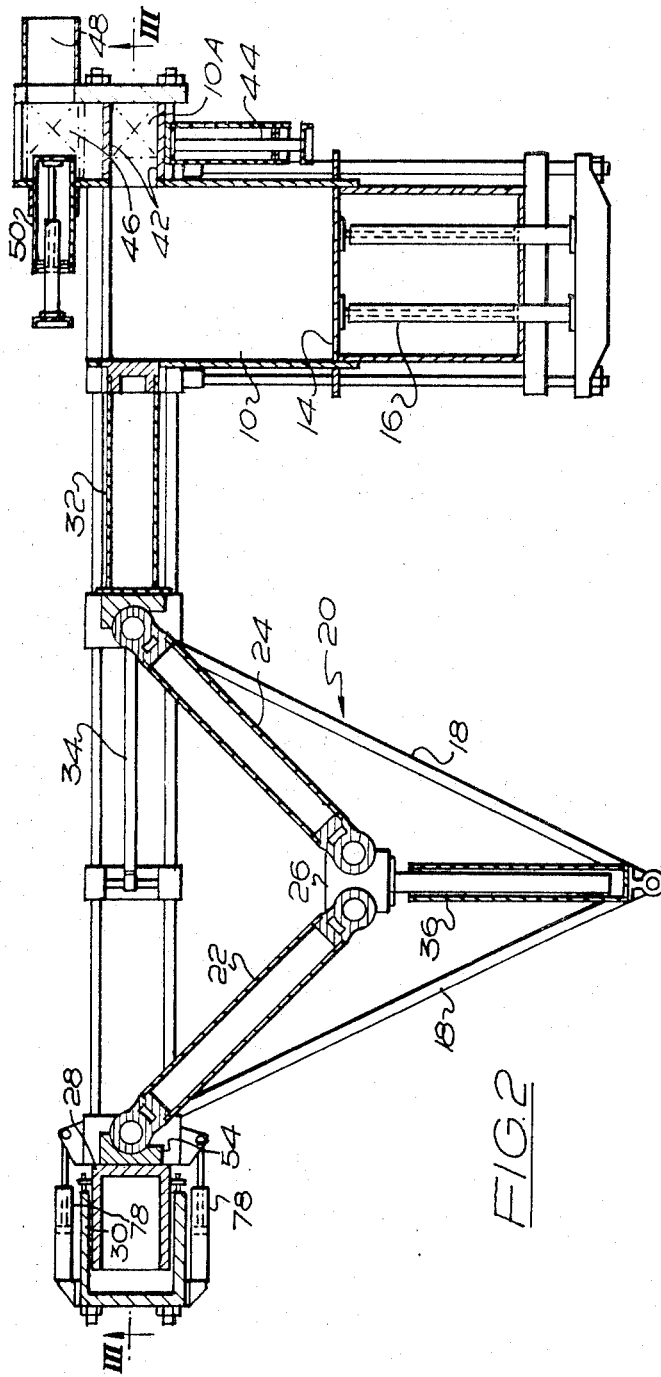
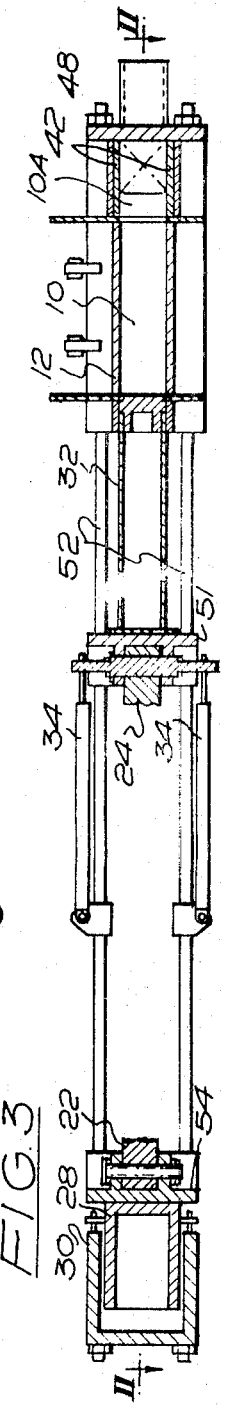

METHOD OF BALING TOWN OR URBAN REFUSE

This invention relates to a method of baling town or urban refuse.

Town or urban refuse is at present created in large quantities in towns, cities and in general in places of human habitation. Its disposal is a continually increasing problem in view of the tendency towards throwaway containers and other articles, although town and urban refuse includes all of the general garbage which flows from human habitation.

One proposal for disposing of the refuse is to burn or incinerate the same, but the cost of an incineration plant, even for an average sized British city is considerable and the ash resulting from the incineration still requires disposal.

Another proposal is to compact batches of the refuse into bales and then bury the bales or drop them into the ocean. This represents a more attractive course to us and indeed we have already invented a baling press which, although it can be used to bale other materials, is principally for baling town refuse.

In baling town refuse, it is always desirable that the resulting bales should be as compact as possible so that the bales will have maximum density or conversely minimum volume.

We have noticed that when town refuse is baled, when the restraining pressure of the baling chamber walls is removed i.e. when the compacted bale is ejected to atmosphere, the bale tends to expand thereby increasing its volume or decreasing its density. This is due to the fact that town refuse in bale form, by the very nature of the refuse, traps air within the bale and this air is compressed during compaction in the bale chamber. When the restraint of the bale chamber walls is removed, the trapped air again expands increasing the bale dimensions.

In this invention we aim to provide a method of baling town refuse whereby this tendency of the bale to expand is reduced or eliminated.

According to the present invention there is provided, a method of baling town refuse wherein a batch of loose refuse is compacted under power in a final baling chamber of the form which the bale is to take, and steam is forced into the refuse before it reaches final compaction chamber displacing air from pockets inside the refuse and thereby, in the finally compact bale, becoming trapped in said pockets in place of air.

By this method the spaces in the bale become filled or partly filled with steam as opposed to air and upon ejection of the bale from the bale chamber this steam tends to cool and condense and therefore create partial vacuums in the bale spaces rather than pockets of high pressure tending to increase the bale dimensions in the case of pockets of air. The bale dimension, as dictated by the baling chamber tends therefore to remain more stable.

The steam may be injected into the baling chamber before, after or simultaneously with compaction of the bale, or it may be injected into the chamber at a stage or stages where an initial but not the final compaction of the bale has taken place.

The compaction process may take place in two stages in the manner as set forth in our co-pending application 107,818, filed Jan. 19, 1971, now abandoned, that is, the batch of loose town refuse may be loaded into a first compaction chamber where it is given an initial compaction, and then it may be compacted in a direction transverse to the direction of initial compaction, during which subsequent compaction the bale is pushed from the first compaction chamber into a second compaction chamber wherein it is compacted to final size. The steam may be injected into the first or second compaction chamber or both. The second bale chamber may then be displaced, whilst containing the compacted bale, to an ejection station whereat the compacted bale, containing steam in the spaces therein, is ejected from the second compaction chamber.

An embodiment of the present invention will now be described, by way of example, with reference to the accompanying drawings, wherein :

FIG. 1 is a perspective view of a baling press for town refuse and adapted to bale the refuse according to the embodiment of the invention;

FIG. 2 is a sectional plan of the press shown in FIG. 1 the section being taken on the line II — II of FIG. 3;

FIG. 3 is a sectional elevation of the press shown in FIGS. 1 and 2, the section being taken on line III — III of FIG. 2; and FIG. 4 shows, to an enlarged scale, details in section, of the second baling chamber.

Referring to the drawings, and firstly to FIGS. 1 to 3, the baling press comprises a first compacting chamber 10 which is generally rectangular and is closable by a door 12. One side of the chamber 10 is defined by a first compaction plate 14 (FIG. 2) which is movable horizontally by a pair of first compacting, double acting rams 16. As the rams 16 are extended from the position shown in FIGS. 1 and 2, plate 14 is moved into the first compacting chamber 10.

The baler press includes a second compaction means in the form of a toggle joint mechanism indicated generally by reference numeral 20 and comprising two arms 22 and 24 having a pair of adjacent ends pivoted to pivot block 26. The other end of arm 22 is connected to a compensating piston 28 which is housed in a fixed compensating cylinder 30. The free end of arm 24 is pivotally connected to a compaction bar 32 (see FIG. 2) which presses upon the batch of material after initial compaction by plate 14 to perform the final compaction thereof and the movement of the pre-compacted bale into the final baling chamber 10A (FIGS. 2 and 3). The toggle mechanism 20 is adapted to move from the jack-knifed position shown in FIGS. 1 and 2 to a position in which arms 22 and 24 are in alignment during which movement further compaction of the bale takes place and also the bale is pushed into the baling chamber 10A. The moving of the toggle mechanism is effected by means of two sets of rams comprising firstly a pair of double acting rams 34 of small diameter and one single action ram 36 of large diameter and having one end pivotally connected to block 26. The other end of ram 36 is pivotally connected by means of links 18 pivoted at the same pivot points as the other ends of arms 22, 24 and which links 18 contain the thrust of ram 36 within the toggle mechanism. In moving the toggle mechanism from the position shown in FIG. 1, to the position in which the arms 22, 24 are in alignment. Firstly the rams 34 are pressurised and the movement of the toggle mechanism commences. At a predetermined stage in this movement, the ram 36 is also pressurised and assists the rams 34. The second toggle mechanism is raised from the in line or lower position of rams 34 to the jack-knifed position by pressurising the opposite sides of rams 34.

In forming the bale from a batch of material placed in chamber 10, the following sequence of operations takes place. The plate 14 and bar 32 are in the positions shown in FIG. 1, but when the batch of material is introduced into the first compaction chamber 10, then door 12 is closed by means of the hydraulic rams 40 (see FIG. 1) and thereby the batch of material is trapped in chamber 10. Next, the rams 16 move plate 14 to perform the initial compaction in chamber 10 and subsequently rams 34 and ram 36 move and force toggle mechanism 20 to the straight position. During this movement of toggle mechanism 20 the bale is firmly compacted and is also pushed into the bale chamber 10A (see FIG. 2) where it takes up a generally cubic shape. The bale chamber 10A is defined by a tube 42 of heavier gauge metal than chamber 10 because it will have to withstand heavier compaction pressures in the final compaction stages. A slide displacement ram 44 as shown in FIG. 3 next displaces bale chamber 42 and the compacted bale into an ejection section 46, from which the bale is finally ejected through outlet 48 by means of an ejection ram 50 (FIG. 3). The compaction bar 32 is connected to a slide block 51 which slides on guide rods 52. The piston 28 has a slide block 54 which also slides on rails 52.

When the toggle mechanism 20 reaches the lower position, a final compaction force to produce a densely compacted bale of as near cubic form as possible is applied by pressurising the cylinder 30. The cylinder 30 and the various rams 40, 16, 34, 36, 44 and 50 are operated in sequence by a suitable electro-hydraulic control system At the completion of a cycle, the rams return to their initial positions, as shown in the drawings, and another batch of material, such as town refuse, is dropped into the first compaction chamber 10.

In accordance with the method of the invention the batch of material forming the bale is treated with steam to ensure that the spaces or voids within the finally compacted bale are filled or partly filled with steam when the bale is ejected from bale chamber 42. To this end the plate 56 defining an end wall of the second baling chamber 42 is provided with a bore 58 containing a steam injection valve 60 which is connected by a steam pipe 62 to a source of live steam which is at a pressure of 100 p.s.i. At the end of the first compaction stage, but before final compaction by compaction bar 32, steam is injected into the second bale chamber 42 by a momentarily operation of valve 60. During subsequent and final compaction of the bale in the bale chamber 42, the steam is forced into the bale material displacing the air from the spaces therein and if reference is made to FIG. 4 it is to be pointed out that the air escapes past the outer edges of the thrust face of bar 32 as shown by arrows 66, at the input end of bale chamber 42. The result is that the spaces in the final bale are partly or completely filled with steam. This ensures that when the bale is ejected from tube 48, to atmosphere, i.e. the restraint of the walls of tube 42 is removed, the bale does not tend to expand as it would do if the spaces within the bale were filled only with air, due to the fact that the steam condenses and the pressure in the said spaces reduces, whereby bales of maximum density are obtained.

It is to be appreciated that the method of forcing the steam into the bale can be varied as desired. Thus steam may be injected into the bale during initial compaction and it may be injected through thrust plates 14 and/or 32. Again, in any or both compaction stages, the compaction may be stopped at an intermediate position and the steam injected thereinto, and then the compaction process completed.

Moreover, it will be appreciated that the method can be used in other types of baling presses such as the type wherein the batch of material is baled in a single stroke of a hydraulic ram acting directly on a compaction plate.

I claim:

1. A method of forming in a bale chamber a highly compacted bale from a batch of refuse comprising the steps of:

filling the bale chamber with steam; and forcing a loose batch of refuse under power into the baling chamber and compacting it in the chamber causing the steam to displace air from pockets in the refuse and thereby preventing the pockets in the refuse from trapping air during the compaction, said pockets being filled with steam so that the subsequent condensation of said steam causes a partial vacuum to aid compaction.

2. The method of claim 1 wherein the refuse is given initial compaction in the bale chamber in the presence of steam to form a partly formed bale and then the partly formed bale is subjected to a step of final compaction.

* * * * *